2,810,638

METHOD OF ELUTING ADSORBED COMPLEX CYANIDES OF GOLD AND SILVER

Wayne C. Hazen, Los Alamos, N. Mex.

No Drawing. Application January 5, 1953,
Serial No. 329,743

7 Claims. (Cl. 75—107)

This invention relates to the recovery of mineral values from ores and other sources, and more particularly to the recovery of gold and silver values from ores, process solutions, and the like, by means of discoveries which enable improvements in the well-known cyanide process.

In the conventional cyanide process, gold is recovered from ores in which it occurs in its native state by the action of cyanide ion upon the native gold in the presence of an oxidizing agent, typically the oxygen of the air. Sodium or calcium cyanide is usually employed as the source of cyanide ion. The gold is dissolved as a water soluble complex cyanide, and this solution is separated by physical means from the solid gangue, or worthless matter of the ore. Silver minerals are usually found along with the gold, and most of this silver may also be dissolved as the soluble complex cyanide. After separation from the tailings, the "pregnant" liquor is treated with reducing means such as zinc shavings, zinc dust or other reducing metal dusts, shavings, or amalgams, to reduce the gold and silver to the metallic state and separate it from the liquor.

The overall process must be economic: unless the value of the metals recovered exceeds the cost of operation, the process will not in general have industrial utility.

Among the typical process expenses in the cyanide method are those of mining the ore, transporting it to the mill, crushing and grinding, agitating the ground ore as a "pulp" with cyanide bearing solution, separating the liquor from the tailings, and recovering the values from the liquor. In addition, the cyanide and other chemicals used are a significant expense. Sometimes the cost of one individual process step is so high for a particular ore that there is no cyanidation treatment which is economical. For example, separation of liquid and solid phases, i. e., by filtration or thickening, may be prohibitively expensive, particularly in case of slimey or clayey ores.

Gold ores are often profitably worked where only two or three dollars' worth of gold can be recovered from a ton of ore, but frequently a portion of the gold present in the ore cannot be recovered without going to expense beyond the value of the increase in recovery. The values lost in the tailings are normally of two sorts: values which have not been dissolved from the original heads, and dissolved values which are not recovered, termed "soluble loss." Any improvement in a process which will enable the economic recovery of these values previously lost is attractive.

One method which has been considered for improving the recovery of values from cyanide liquors is the use of adsorbents to attract and concentrate the gold or silver complex cyanides and facilitate removal thereof from cyanide liquor or from a mixture of cyanide liquor and gangue solids where the solids are not readily separable from the liquid. An adsorbent thus serves as a concentrator of the desired mineral values: from being dissolved in the liquor, they have become "trapped" on the solid adsorbent. One adsorbent which has found some industrial employment in gold and silver ore treatment is charcoal. Studies have been made also of the applicability of ion exchange resin adsorbents to the problem. However, simple and ready means of recovery of mineral values from these resin adsorbents have not been available to date.

Those means which have been suggested for recovery of values from ion exchange resins have involved large volumes of solutions, low over-all recovery, or complete destruction of the resin, and in general have been uneconomical and have not been used in industry. Means for recovery from charcoal adsorbents have been expensive autoclaving, or burning, which involves destruction and loss of the charcoal. Another suggested process utilizes two steps: first, a leach with sodium cyanide to remove silver and second, a leach with sodium sulfide to remove gold.

It is, therefore, an object of this invention to provide an improved method for the recovery of metal values from ores and other sources.

It is another object of this invention to provide a simple and economic means of facilitating the recovery of metal values from ores by the cyanide process.

It is a further object of this invention to provide an effective and inexpensive method for the recovery of gold and silver values from cyanide liquors from ore treatment, plating baths, process solutions and the like.

Still another object of this invention is to provide a method useful for the recovery of gold and silver values from sources which are convertible to cyanide liquors.

It is still a further object of this invention to provide a simple and practical method for recovering gold and silver values from anion exchange resins and other anion adsorbents.

These objects, and other objects which will become apparent from the disclosure to follow, are achieved through my discovery that certain complex cyanides in solution can be used very effectively to displace the complex cyanides of gold and silver from adsorbing agents such as anion exchange resins. Such complex cyanide solutions when applied to an adsorbent loaded with gold or silver cause the values to be "eluted" or released from the adsorbent into the solution. The class of complex cyanides which I have found desirable in the practice of my invention are the complex cyanides of zinc, cadmium and mercury. Zinc complex cyanide is preferred, in that it is least expensive, and also is more convenient in other ways.

I have further discovered that if I use a reducing agent which is not dissolved in the eluting solution but is in effective contact with it, I can directly and simply recover gold and silver values in the metallic state. This discovery is not limited to my preferred eluting agents, but is more general. If the reducing agent is dissolved, part of the values may be reduced within the adsorbent matrix, and thus not recovered in that cycle. The recycling of values in the adsorbent is, in general, not desirable.

A preferred embodiment of my method in regard to adsorbing agent, reducing agent, and eluting agent, is to agitate loaded strong base anion exchange resin and zinc dust in a moderately dilute solution of zinc cyanide complex. The resin has conveniently been employed to adsorb gold and/or silver values from a mixture of ore pulp and cyanide liquor. This loaded resin has been then separated by mechanical means, such as screening, and transferred into a simple closed agitator together with the zinc cyanide solution and the zinc dust. After the oxygen from the air is removed by purging or other means, a suitable period of agitation is employed, after which another mechanical separation provides barren liquor, "unloaded" resin, and a mixture of zinc and gold and/or silver dust. This mixed dust is similar to that customarily produced by the conventional direct zinc-dust treatment of cyanide liquors and therefore can be treated in the same manner from there on.

A signal advantage of the instant process is that it allows use of powerful adsorbents such as strong base anion resins with consequent benefit to recovery, and with the advantage of enabling the unloading of the adsorbent by small volume of eluting solution in simple equipment. Processes wherein ineffective eluting agents are used are unsuitable for use with strong base anion resins in terms of inability to take advantage of the special character of the resin. Values may be recovered by this method from ores that cannot be handled at all by the conventional cyanide process. In particular, the use of a one-stage system for elution and "precipitation" of the precious metal values from the loaded resin affords major advantages in simplicity of equipment and in lowered operating costs.

I prefer to use in my process a strong base anion-exchange resin as the adsorbent material. Such resins are well known in the art: they are manufactured by including or generating a strongly basic material at one stage or another in the preparation of a resin, so that the resulting solid resin contains strong basic groups in its structure. Reference is made to Kunin and Myers, "Ion Exchange Resins," John Wiley & Sons, Inc., New York, N. Y. (1950), pages 57, 59 and 60, for a discussion of this subject. I do not wish to limit my invention in regard to the adsorbent medium employed; however, it is obviously advantageous to employ the most effective one, and strong base anion-exchange resins are the most effective adsorbents I have found. Heretofore, such resins have not been generally considered for gold and silver recovery because no effective eluting agent or process was available, and because of still another problem, as set forth below.

After treatment of the resin with the complex cyanide eluting solution, gold and silver values are removed from liquors by it only poorly and a further "regeneration" is desirable before reuse. In view of the high cost of the resins, reuse is probably an economic necessity. I have found that a treatment with dilute acid or with ammonium hydroxide will restore the adsorbent to a condition where it may be reused to adsorb further gold or silver values from cyanide liquors. Therefore, the preferred embodiment of the complete process of my invention comprises the following steps: adsorption of mineral (gold and/or silver) values from cyanide liquors, either in the presence of ore solids or from a separated cyanide liquor from either mining or other sources; separation of the loaded adsorbent; elution of the values from the adsorbent by zinc complex cyanide solution in the presence of zinc dust to effect recovery of the values in metallic form, and, finally, regeneration of the adsorbent, preferably with dilute acid, so that the adsorbent may be recycled.

Adsorbed cyanide will be released as hydrogen cyanide by the action of the acid in the regeneration step, and may be recovered, e. g. in caustic solution, for reuse. It is, of course, preferable to employ an acid which does not form an insoluble material with the metals present, especially with the metal of the eluting solution. When ammonia solution is used as the regenerant, the cyanide values are kept in the solution, e. g. as dissolved ammonium cyanide.

Among the advantages of my process are possible increases in recovery of gold and silver values by the use of strong base anion-exchange resins, a class of adsorbents not hitherto practical, for there was available no economic method for recovery of the mineral values from these highly effective adsorbents, nor was any method available for the regeneration of these resins after the values had been eluted. Such resins are relatively expensive; they cannot ordinarily be destroyed in the recovery of adsorbed values if the over-all process is to be profitable.

An aspect of the use of strong base anion-exchange resins is the effective treatment of "slimey" ores where there is extensive loss of gold and/or silver values as "solubles," or where the solids cannot readily be separated from the liquor so that the values could not be recovered at all. When a charge of resin is agitated with a slimey pulp, essentially all of the "soluble" values (gold and/or silver) can be adsorbed by the resin. The resin may readily be separated, e. g., screened out of the system, and the values may be recovered in a separate operation, leaving the resin in reusable condition as set forth above.

The following examples are given by way of illustration only; since many variations will be apparent to those skilled in these arts without departing from the scope of my discoveries, my invention is to be limited only as set forth in the appended claims.

The following examples illustrate the application of anion exchange resins to the recovery of gold and silver values from "difficult" ores.

*Example 1*

A particular gold bearing ore consists mostly of minus 325 mesh slimes of siliceous minerals and contains a small amount of graphitic carbon. A sample of the ore is given a standard cyanidation test by agitating on rolls in an open bottle at a 2:1 dilution with a cyanide solution containing .5 pound of sodium cyanide and 1.5 pounds of lime per ton of solution. After 14 hours of agitation, the pulp is filtered and the solids are thoroughly washed with distilled water. The filter cake is then dried and assayed with the following results:

Heads _____ oz. gold per ton__ .10
Tails _____ do____ .08
Extraction _____ percent__ 20

*Example 2*

A second sample of the same ore is agitated exactly as above except that plus 30 mesh strong base anion resin is added in an amount equal to 50 pounds per ton of ore. After the 14 hours' agitation, the resin is screened out of the pulp, after which the liquids and solids are separated by filtration and the filter cake is washed and dried. The assay of the tailings and resin are given below:

Head assay_____ oz. gold per ton of ore__ .10
Tails assay_____ do____ .008
Resin assay_____ do____ .09
Calculated extraction based on resin assay_____
                                                percent__ 90

*Example 3*

A gold and silver bearing ore of slimey character contains fine quartz, kaolin and iron silicates. The ore is so slimey (settles and filters poorly) that the cost of standard cyanidation is too high to make extraction of the gold profitable. A sample of ore is dry ground to minus 100 mesh and is agitated with a solution containing 1.5 pounds of sodium cyanide and 7.5 pounds of lime per ton in an open bottle on rolls. An amount of plus 30 mesh weak base anion resin equivalent to 80 pounds per ton of ore is added to the pulp before leaching. After 48 hours' agitation, the resin is removed by screening, the pulp is filtered and the solids washed and assayed in the standard manner with the following results:

| Heads assay (oz./ton) | | Tailings assay (oz./ton) | | Percent Extraction | |
|---|---|---|---|---|---|
| Gold | Silver | Gold | Silver | Gold | Silver |
| .12 | 1.6 | .028 | .7 | 77 | 56 |

The following examples illustrate the elution of gold and silver values from a resin adsorbent.

Example 4

A small sample of strong base anion resin which contains adsorbed gold cyanide complex such as obtained from one use of the resin in cyanidation of a gold bearing ore is agitated with various solutions in tightly stoppered bottles for 12 hours to determine the efficiency of various eluting agents which are of general use. After agitation, the eluting solution is decanted from the resin and assayed for gold content. The results are tabulated below:

| Eluting agent: | Percent of gold removed from resin |
|---|---|
| Hydrochloric acid (1 molal) | 2 |
| Sodium carbonate (1 molal) | 5 |
| Sodium chloride solution (saturated) | 24 |
| Sodium sulfate solution (2 molal) | 10 |
| Ammonium hydroxide (10 molal) | 3 |
| Sodium cyanide solution (6 molal) | 12 |

Example 5

Tests comparable to those in the above example are run in which gold loaded strong base anion resin is agitated with solutions of composition shown in the table below for 12 hours, after which the solution is decanted from the resin and assayed. Zinc cyanide complex solution is prepared by dissolving 12.1 grams of zinc oxide in 500 cc. of water containing 33.4 grams of sodium cyanide. Mercuric cyanide complex is prepared by dissolving 1.63 grams of mercuric chloride in 100 cc. of water containing 2 grams of sodium cyanide.

| Eluting solution: | Percent of gold recovered from resin |
|---|---|
| Zinc cyanide complex solution | 86 |
| Mercuric cyanide complex solution | 91 |

Example 6

100 milligrams of strong base anion resin containing gold adsorbed from a gold bearing cyanide solution are placed in a 150 cc. bottle with 100 cc. of solution containing zinc cyanide complex at a concentration of .06 mole per liter made by dissolving .5 gram of zinc oxide and 1.3 grams of sodium cyanide. One gram of zinc dust is added to the mixture after which the bottle is tightly stoppered and agitated on rolls for 9 hours. After agitation, the resin is screened from the mixture on a 100 mesh screen and washed free of adhering metal particles with water, dried and assayed.

| | | |
|---|---|---|
| Original gold content of resin | mgs | 4.40 |
| Final gold content of resin | mgs | .35 |
| Gold removed from resin | percent | 92 |

The following examples are given to illustrate regeneration of the unloaded resin.

Example 7

Treatment of resin after zinc cyanide regeneration to make it re-usable:

(a) Standard adsorption by anion resin for Au(CN)$^{-2}$ solution:

100 mgs. anion resin are agitated for 4 hours with 100 cc. of sodium cyanide solution containing 4.40 mgs. of dissolved gold. Resin and solution are separated by decantation. Assay shows that the total gold remaining in solution is .04 mg. (1%). The resin consistently takes all the gold out of solution.

(b) Standard adsorption test after regeneration with zinc cyanide complex:

100 mgs. of resin which has been loaded with gold by adsorption from cyanide solution is eluted with a zinc cyanide complex—zinc dust treatment until it has only .65 mg. of gold left. The resin is then given a test for adsorption power by agitating for 4 hours with 100 cc. of the solution containing 4.40 mgs. of gold in cyanide solution. After this treatment, the solution contains 1.90 mgs. of gold showing that the adsorptive capacity of the resin has not been completely restored by the zinc cyanide-zinc dust elution.

(c) Standard adsorption test after elution with zinc cyanide and regeneration with ammonium hydroxide:

100 mgs. of loaded resin is eluted by agitating with 100 cc. of .06 molal zinc cyanide complex solution for 4 hours. The zinc cyanide solution is then decanted and the resin agitated for 7 hours with an 8 M solution of ammonium hydroxide. After the above treatments, the resin is given the standard adsorption test by agitating with 100 cc. of cyanide solution containing 4.4 mgs. of gold. After agitation, the solution contains only .14 mg. of gold showing that the adsorptive capacity of the resin has been effectively restored.

(d) Standard adsorption test after elution with zinc cyanide and regeneration with hydrochloric acid:

100 mgs. of loaded resin is eluted by agitation with 100 cc. of .06 M zinc cyanide complex solution for 4 hours. The zinc cyanide complex solution is then decanted and the resin agitated for 7 hours with 100 cc. of 1 N hydrochloric acid. The resin is removed from the hydrochloric acid, washed with water and given the standard adsorption test by agitating with 100 cc. of cyanide solution containing 4.4 mgs. of gold. After agitation, the solution contains only .02 mg. of gold, demonstrating that the adsorptive capacity of the resin has been restored.

The next example is given to illustrate the application of my process to a silver complex cyanide recovery problem.

Example 8

One gram of anion resin is loaded with 97.7 milligrams of silver by adsorption from a cyanide solution such as obtained by cyanidation of a silver bearing ore. This resin is then placed in a bottle containing 100 cc. of solution containing zinc cyanide complex at a concentration of .25 mole per liter, sodium cyanide at .5 mole per liter and CaO at 1 gram per liter. Two grams of zinc dust are then added to the mixture, the air removed by evacuation and the contents stirred for 36 hours. At the end of this time, the resin is screened from the mixture on a 65 mesh screen, washed free of adhering metal dust with water and assayed for silver with the following results:

| | | |
|---|---|---|
| Silver on loaded resin | mgs | 97.7 |
| Silver on unloaded resin | mg | .76 |
| Efficiency of unloading | percent | 99.2 |

The above illustrations serve to demonstrate some of the applications of my invention. The three complex cyanides, zinc, cadmium and mercury serve about equally well in my process. The examples have been directed largely to zinc because of its convenience and availability. The use of mercury complex cyanide suffers to some extent from the ready reducibility of the merucy to lower valent or to the metallic states, and mercuric complex cyanide may generally be employed as an eluting agent only under conditions which are not strongly reducing.

While especial reference has been made to zinc dust as a reducing agent, other metal dusts or shavings, such as those of magnesium and aluminum may be employed when convenient, as may amalgams of active metals and electrolysis.

My process has been disclosed especially as applied to strong base anion exchange resins because of their advantageous nature. It is also applicable to other adsorbents, although some adaptation of the process may well be necessary to obtain optimum results in some cases. The need for such adaptation of processes is well known in the mining art, and is recognized as lying within the skill of the art.

What I claim is:

1. The method for removing gold and silver complex cyanides from adsorption on a material selected from the class consisting of anion exchange resins and charcoal which comprises treating the adsorbent with an eluting solution of a complex cyanide chosen from the class consisting of the complex cyanides of zinc, cadmium and mercury, and mixtures thereof.

2. The method of claim 1 wherein the adsorbent is an anion exchange resin.

3. The method of claim 2 wherein the eluting solution is a solution of zinc complex cyanide.

4. The method of claim 2 wherein the adsorbent, after elution, is regenerated by treatment with dilute acid.

5. The method of claim 2 wherein the adsorbent, after elution, is regenerated by treatment with dilute ammonium hydroxide.

6. The method of claim 1 wherein the adsorbent is a strong-base anion exchange resin.

7. The method for recovering gold and silver from their complex cyanides, which cyanides are adsorbed onto a material selected from the class consisting of anion exchange resins and charcoal, which comprises eluting said cyanides from the loaded adsorbent with an eluting solution of a complex cyanide of zinc, which solution is in contact with a reducing agent present in a phase separate from said solution and from said adsorbent, whereby gold and silver values are eluted from said adsorbent and are recovered in reduced form.

References Cited in the file of this patent

UNITED STATES PATENTS

| | | |
|---|---|---|
| 61,866 | Rae | Feb. 5, 1867 |
| 2,038,844 | De Alzugaray | Aug. 3, 1937 |
| 2,648,601 | Byler et al. | Aug. 11, 1953 |

OTHER REFERENCES

Bureau of Mines Report on Investigation #4374, "Applications of Ion Exchange Resins in the Cyanidation of a Gold and Silver Ore" (January 1949), page 3.

Kunin, R., and Myers, R. J.: "Ion Exchange Resins," pages 59 and 63.

Kunin et al.: "Ion Exchange Resins," New York: Wiley, 1950, page 25.